(12) United States Patent
Gibbons et al.

(10) Patent No.: US 8,550,548 B2
(45) Date of Patent: Oct. 8, 2013

(54) CANOPY FOR USE WITH CAR SEAT OR STROLLER

(75) Inventors: Haley Gibbons, Wheatridge, CO (US); Cathy McNeil, Golden, CO (US)

(73) Assignee: The Boppy Company, LLC, Golden, CO (US)

( * ) Notice: Subject to any disclaimer, the term of this patent is extended or adjusted under 35 U.S.C. 154(b) by 64 days.

(21) Appl. No.: 13/104,559

(22) Filed: May 10, 2011

(65) Prior Publication Data
US 2012/0286547 A1 Nov. 15, 2012

(51) Int. Cl.
*A47C 7/62* (2006.01)
(52) U.S. Cl.
USPC .................................................. 297/184.13
(58) Field of Classification Search
USPC ............... 297/184.11, 184.16, 184.1, 219.12, 297/250.1, 130, 184.17, 184.13
See application file for complete search history.

(56) References Cited

U.S. PATENT DOCUMENTS

| | | | |
|---|---|---|---|
| 4,761,032 A | 8/1988 | Sanchez et al. | |
| 4,946,221 A | 8/1990 | Livingston | |
| 4,997,231 A | 3/1991 | Smith | |
| 5,184,865 A * | 2/1993 | Mohtasham et al. | 296/77.1 |
| D335,965 S | 6/1993 | Spring | |
| 5,432,965 A | 7/1995 | Espinoza | |
| 5,437,061 A * | 8/1995 | Kenner | 2/69 |
| 5,522,639 A | 6/1996 | Jaime | |
| 5,730,490 A * | 3/1998 | Mortenson | 297/184.13 |
| 5,806,924 A * | 9/1998 | Gonas | 297/216.11 |
| D402,152 S | 12/1998 | Seats et al. | |
| D404,597 S | 1/1999 | Chavez et al. | |
| 5,947,555 A * | 9/1999 | Welsh et al. | 297/130 |
| 6,012,184 A | 1/2000 | Childers | |
| 6,012,756 A | 1/2000 | Clark-Dickson | |
| 6,019,421 A | 2/2000 | Roh | |
| 6,039,393 A * | 3/2000 | Roh | 297/184.13 |
| 6,056,355 A | 5/2000 | Klassen | |
| 6,068,322 A * | 5/2000 | Kuester | 296/97.21 |
| D426,091 S | 6/2000 | White | |
| D431,377 S | 10/2000 | Buggs | |
| D433,851 S | 11/2000 | Roh | |

(Continued)

FOREIGN PATENT DOCUMENTS

AU 691784 B 5/1998

OTHER PUBLICATIONS

Author Unknown, turtle toppy® advertisement, "Introducing Our New Lineup," Baby Maternity Retailer, Nov. 2010, 1 page.

(Continued)

*Primary Examiner* — Rodney B White
*Assistant Examiner* — Richard Lowry
(74) *Attorney, Agent, or Firm* — Kilpatrick Townsend & Stockton LLP (57) ABSTRACT

Embodiments of the present invention provide a stowable covering that fits about a child seat to cover an infant or child placed therein. The covering may include a sheet of flexible fabric having a top surface, a bottom surface, an outer periphery defining an opening through which a portion of the child seat may be received, a coupling mechanism at the outer periphery, and a pocket. The coupling mechanism may be configured to secure the sheet about the child seat by constricting about a portion of the child seat and the pocket may be coupled to the sheet to permit the sheet to be folded and stowed within the pocket.

15 Claims, 7 Drawing Sheets

(56) References Cited

U.S. PATENT DOCUMENTS

| | | | |
|---|---|---|---|
| 6,209,953 | B1 | 4/2001 | Mackay et al. |
| 6,224,073 | B1 * | 5/2001 | Au .................... 280/47.38 |
| 6,428,098 | B1 * | 8/2002 | Allbaugh ............. 297/219.12 |
| 6,481,791 | B1 * | 11/2002 | Facchini et al. ....... 297/184.13 |
| 6,517,153 | B1 * | 2/2003 | Brewer ............... 297/184.13 |
| 6,547,325 | B2 | 4/2003 | Drost et al. |
| D509,699 | S | 9/2005 | Reamer |
| 7,000,625 | B2 | 2/2006 | Dickson et al. |
| 7,083,228 | B1 * | 8/2006 | Al Sawan ............. 297/184.13 |
| D530,559 | S * | 10/2006 | Fails .................. D6/611 |
| 7,118,173 | B2 | 10/2006 | Kassai et al. |
| 7,150,499 | B2 * | 12/2006 | McGregor ............ 297/184.13 |
| 7,204,551 | B2 * | 4/2007 | Kahan ................ 297/184.11 |
| 7,213,878 | B2 * | 5/2007 | Delapaz .............. 297/219.12 |
| 7,284,790 | B1 | 10/2007 | Brewer |
| 7,354,049 | B2 * | 4/2008 | Schmidt .............. 280/33.993 |
| 7,431,395 | B2 * | 10/2008 | Morgan et al. ........ 297/219.12 |
| D601,845 | S | 10/2009 | Pierce |
| D619,939 | S * | 7/2010 | Olsen ................. D12/133 |
| 7,891,732 | B2 * | 2/2011 | Hei et al. ............. 297/184.13 |
| 2001/0035672 | A1 * | 11/2001 | Graff .................. 297/229 |
| 2003/0193221 | A1 * | 10/2003 | Hoey-Slocombe et al. ............... 297/184.13 |
| 2007/0257526 | A1 * | 11/2007 | Hei et al. ............. 297/184.13 |
| 2008/0252115 | A1 * | 10/2008 | Machabee ............ 297/217.1 |
| 2008/0309129 | A1 | 12/2008 | Blakeman et al. |
| 2010/0038939 | A1 * | 2/2010 | Kim ................... 297/184.13 |
| 2010/0072793 | A1 * | 3/2010 | Kress ................. 297/184.13 |

OTHER PUBLICATIONS

Author Unknown, turtle toppy® products, [online] Turtle Toppy, LLC, [retrieved Jul. 28, 2011], Retrieved from the Internet: http://www.turtletoppy.com/products.html.

Author Unknown, "BabbaCover Airy Cotton," BabbaCo, http://www.babbaco.com/ProductDetail/tabid/78/pid/33/BabbaCover-Janie-Jules-in-Airy-Cotton.aspx, accessed May 9, 2011, 1 page.

Author Unknown, "BabbaCover Airy Cotton containing baby," BabbaCo, http://www.babbaco.com/ProductDetail/tabid/78/pid/33/BabbaCover-Janie-Jules-in-Airy-Cotton.aspx, accessed May 9, 2011, 1 page.

Author Unknown; "BabbaCover Airy Cotton containing covered baby," BabbaCo, http://www.babbaco.com/ProductDetail/tabid/78/pid/33/BabbaCover-Janie-Jules-in-Airy-Cotton.aspx, accessed May 9, 2011, 1 page.

Author Unknown: "BabbaCover Airy Cotton containing stroller," BabbCo, http://www.babbaco.com/ProductDetail/tabid/78/pid/33/BabbaCover-Janie-Jules-in-Airy-Cotton.aspx, accessed May 9, 2011, 1 page.

Author Unknown, "Baby's Cozy World Microfiber Embroidered Cover Warm Grey," Amazon.com, http://www.amazon.com/Babys-Cozy-World-Microfiber-Embroidered/dp/B000VPPS74/re, accessed May 9, 2011, 5 pages.

Author Unknown, "Baby's Cozy World Sun & Bug Cover—Pink Dots," Amazon.com, http://www.amazon.com/Babys-Cozy-World-Sun-Cover/dp/B00429RLY8/ref=sr_1_2?ie=, accessed May 9, 2011, 6 pages.

Author Unknown, "BabyShade® Double Stroller Cover Protects Infants in Canopied Twin Strollers from Sun, Rain Wind and Flying Insects," Amazon.com, http://www.amazon.com/gp/product/B00008VU6T/ref=pd_lpo_k2_dp_sr_3?pf_rd_p=486, accessed May 9, 2011, 7 pages.

Author Unknown, "Car Seat Canopy," JJ Cole Collections, http://jjcolecollections.com/car-seat-canopy, accessed May 9, 2011, 1 page.

Author Unknown, "Car Seat Cover," JJ Cole Collections, http://jjcolecollections.com/car-seat-cover, accessed May 9, 2011, 1 page.

Author Unknown, "Car Seat Covers—Car Seat Jackets," Tivoli Couture, http://www.tivolicouture.com/Car-Seat-Covers-Car-Seat-Jackets.htm, accessed May 9, 2011, 2 pages.

Author Unknown "Classic Sunshade," Protect-a-Bub, http://www.protect-a-bubusa.com/pr_classic-sunshade.html, accessed May 9, 2011, 1 page.

Author Unknown, "Deluxe 3-in-1 Sunshade containing Canopy-style coverage," Protect-a-Bub, http://www.protect-a-bubusa.com/pr_deluxe-3-in-1-sunshade.html, accessed May 9, 2011, 1 page.

Author Unknown, "Deluxe 3-in-1 Sunshade containing Complete UV protection," Protect-a-Bub, http://www.protect-a-bubusa.com/pr_deluxe-3-in-1-sunshade.html, accessed May 9, 2011, 1 page.

Author Unknown, "Deluxe 3-in-1 Sunshade containing Mesh viewing window," Protect-a-Bub, http://www.protect-a-bubusa.com/pr_deluxe-3-in-1-sunshade.html, accessed May 9, 2011, 1 page.

Author Unknown, "Kiddopotamus BabyShade Adjustable Stroller Cover," Safe and Secure Baby, http://www.safeandsecurebaby.com/kiddopotamus-babyshade-adjustable-stroller-cover.html, accessed May 9, 2011, 1 page.

Author Unknown, "RayShade®," Summer Infant, http://www.summerinfant.com/Products/Travel/Car/RayShade®.aspx, accessed May 9, 2011, 1 page.

\* cited by examiner

CANOPY FOR USE WITH CAR SEAT OR STROLLER

BACKGROUND OF THE INVENTION

Embodiments of the invention relate generally to coverings for child seats and more specifically to coverings that are useable with stroller seats, infant carriers, and car seats to cover or partially cover a child seated in the stroller seat, infant carrier, or car seat.

Child seats are designed to safely secure a child to protect the child during transportation and/or other activities. Child seats include infant carriers, car seats, strollers, and the like. Infant carriers and car seats are close in design and function, except that infant carriers are generally designed to removably couple with a base unit secured to a vehicle. The infant carriers may be conveniently removed from the base unit and transported while an infant or newborn remains restrained within the infant carrier.

Child seats are often designed to provide comfort to a child that is secured within the seat. Typically these seats are made of a plastic or metal base (e.g., polypropylene base or tubing) and include fabric liners, padding (e.g., foam padding), constraint belts, buckles, handles, wheels, and the like. Child seats may also include other components, such as pockets, shade coverings, wheel locks, and the like. Additional components and/or attachments are often used with child seats, such as toys that hang from a handle or trays that attach to the child seat that support a child's food or drink.

Child seats may be used for children of various ages and sizes ranging from infants to school age children. The child seat may be adjustable so that the child seat may continue to be used as the child grows. When using child seats for newborns and infants, special care is often needed due to their fragile nature. For example, newborns and infants may need to be sheltered and protected from environmental elements such as wind, rain, insects and bugs, which may have a greater effect on newborns and infants due to their fragile natures. Infant carriers, car seats, and strollers are sometimes covered with blankets or sheets to shelter or protect children seated in the infant carrier, car seat, or stroller from environmental elements and/or other external objects. It may also be desirable to cover or shelter children in infant carriers, car seats, and strollers to draw attention away from the child so that the child may rest and/or not be disturbed from individuals and/or objects. For these and other reasons, it may be desired to provide a shelter or cover for a child seat.

BRIEF SUMMARY OF THE INVENTION

Embodiments of the invention provide for a stowable covering configured to be fitted about a child seat to cover at least a portion of the child seat. The stowable covering may include a sheet of flexible fabric having an expanded shape defined by the child seat when fitted thereto. The sheet may include a top surface, a bottom surface, and an outer periphery defining an opening through which a portion of the child seat may be received. The sheet may also include a coupling mechanism at the outer periphery that is configured to secure the sheet about the child seat by constricting about a portion of the child seat when the stowable covering is fitted thereto. The sheet may further include a pocket coupled to the sheet to permit the sheet to be folded and stowed within the pocket.

The sheet may be folded and stowed within the pocket by everting the pocket. The sheet may additionally include an access opening opposite the opening defined by the outer periphery. The access opening may provide access to a handle of an infant carrier when the stowable covering is fitted thereto. The sheet may additionally include a flap that removably covers the access opening when the stowable covering is fitted about the infant carrier and that removably covers the pocket when the sheet material is folded and stowed therein. The sheet may additionally include a skirt stowable within a pouch. The pouch may be positioned at a front end of the stowable covering. The skirt may be deployable from the pouch to provide additional coverage to a bottom portion of the stowable covering when fitted about the child seat. The pouch may include a zipper to secure the skirt within the pouch. Other fasteners may be used to secure the skirt within the pouch, such as magnets, hook and loop fasteners, buttons, snaps, and the like.

The sheet may additionally include an attachment mechanism that is attachable to an external object (e.g., a fastener of an infant carrier, stroller, and the like) for transportation when the stowable covering is stowed within the pocket. The stowable covering may substantially cover an infant carrier when fitted thereto to fully enclose an infant or child seated in the infant carrier within the stowable covering. Likewise, the stowable covering may substantially cover a stroller seat when fitted thereto to substantially enclose an infant or child seated in the stroller seat. The sheet may additionally include a window that is positioned in front of a child seated in the infant carrier or stroller seat and may additionally include a front flap and a tie. The front flap may have an unfolded position that covers a majority of the window and a folded position in which a majority of the window is uncovered. The tie may be configured to secure the flap in the folded position.

The coupling mechanism may include an elastic band that allows the opening to expand to be fitted over the child seat and that allows the opening to contract or constrict around the child seat to secure the stowable covering to the child seat. Alternatively or additionally, the coupling mechanism may include a drawstring and cord lock slidably coupled with the drawstring, may include separate sections that each include an elastic band, or may include hook and loop fasteners (e.g., straps that couple together or couple with the fabric of the covering). The drawstring and cord lock may allow the opening to expand to be fitted over the child seat and to contract or constrict around the child seat to secure the stowable covering to the child seat. The sheet may additionally include a pair of side windows positioned on opposite sides of the infant or child seated in the stroller seat or infant carrier when the stowable covering is fitted thereto. The child seat may be an infant carrier, a stroller seat, a car seat, or any other seat.

A method for using the stowable covering to cover a child seat may include obtaining a stowable covering including a flexible fabric sheet having a top surface, a bottom surface, an outer periphery, an elastic coupling mechanism, and a pocket as described herein. The method may also include expanding the elastic coupling mechanism and placing the coupling mechanism about at least a portion of the child seat (e.g., infant carrier or stroller seat) such that the sheet covers a majority of the child seat. The method may further include permitting the elastic coupling mechanism to constrict about at least a portion of the child seat to secure the stowable covering to the child seat.

The method may additionally include stowing the stowable covering. Stowing the stowable covering may include folding the sheet together near the pocket and everting the pocket so that the sheet is disposed within the pocket. Stowing the stowable covering may also include securing a flap to the pocket to secure the sheet within the pocket. The method may additionally include deploying a skirt from a pouch of the sheet to cover the feet or lower limbs of a child seated in a stroller seat. As described herein, the stowable covering may include a window positioned in front of an infant or child seated in the child seat and the method may additionally include unfolding a flap coupled with the sheet so that the window is substantially covered by the flap or folding the flap so that the window is substantially uncovered by the flap. The folded flap may be secured with a tie to prevent the flap from unfolding and covering the window.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label.

DETAILED DESCRIPTION OF THE INVENTION

Embodiments of the present invention provide for stowable coverings and methods of using the stowable coverings. The stowable coverings may be used with an infant carrier, a car seat, a stroller, or any other child seat to cover or partially cover a child, such as an infant or newborn, seated in the infant carrier or stroller seat. Although the specification generally describes a child seat, infant carrier, or stroller seat, it should be realized that the stowable covering may be used with any seat that a child may be placed in. In addition, although reference is made herein primarily to infant carriers, it should be realized that the stowable covering may equally be used with car seats.

The stowable covering generally includes a fabric material that may be breathable or non-breathable. For example, the fabric may be breathable so that air may flow through the covering to the child seated in the child seat or the fabric may be non-breathable to prevent cold air from penetrating through the fabric. In addition, the fabric may be water resistant to protect the child from rain, snow or other moisture. Examples of materials that may be used as the fabric material include nylon, LYCRA, polyester, cotton, vinyl, rayon, cotton-polyester blend, and the like. To facilitate airflow into and out of the covering, the covering may include one or more windows made of a mesh material that allows air to easily pass into and out of the covering. Such windows are especially useful when the covering is constructed of a non-breathable material. The covering may also include a central window that is positioned in front of the child seated in the infant carrier. The central window may allow the child to see objects and individuals external to the covering. The covering may also include an elastic band or drawstrings positioned near an opening of the stowable covering that allows the opening to expand and constrict. Alternatively, the covering may include several sections of elastic bands positioned near the opening of the stowable covering that allow the opening to expand and constrict.

The covering may be placed about a child seat by expanding the opening and secured to the child seat by constricting the opening about the child seat. The stowable covering may also include one or more flaps that cover one or more windows and/or other parts of the covering. The stowable covering may be stowed within a pocket of the covering by folding or crumpling the covering near the pocket and subsequently everting the pocket. The covering may be disposed within the pocket when the pocket is everted. The stowed covering may then be stowed and/or transported for later use. The covering may include an attachment mechanism that allows the stowed covering to be hung from other objects, such as the stroller and/or infant carrier for stowage and/or transportation. These and other features of the stowable covering will be further realized with reference to the figures.

Figure 1:
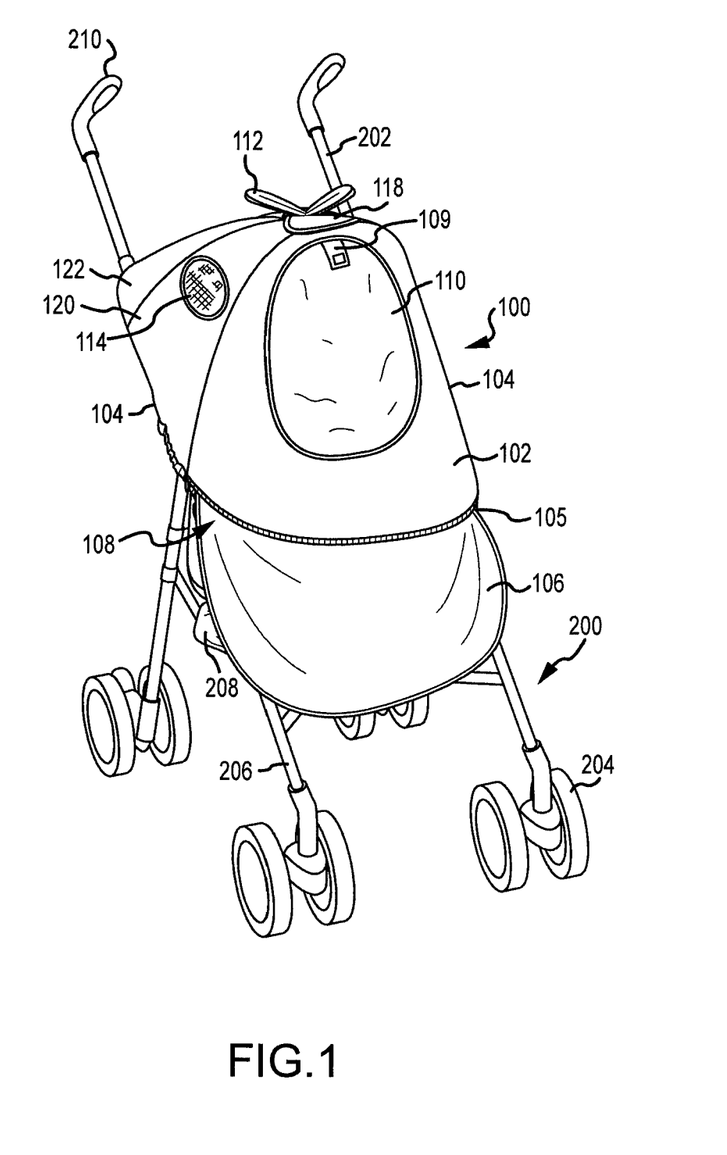
FIGS. 1 and 2 illustrate various features of a stowable covering fitted about a stroller seat according to an embodiment of the present invention.
Figure 2:
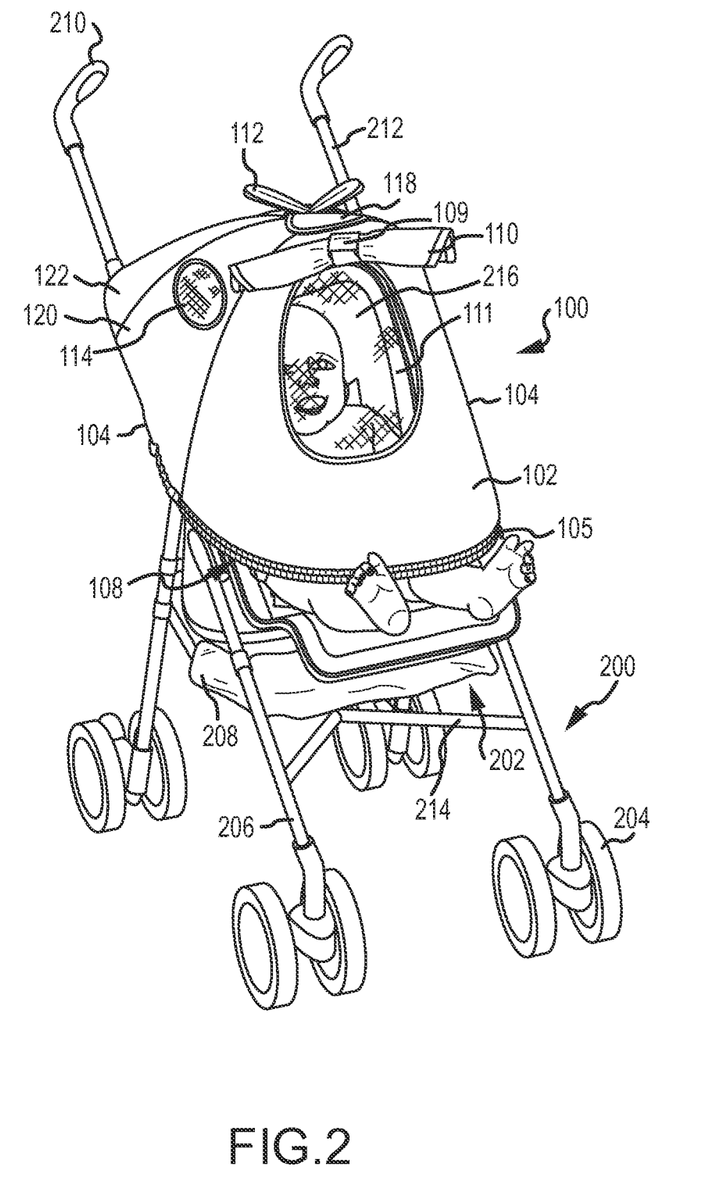

Referring now to FIGS. 1 and 2, depicted is a stowable covering 100 fitted about a seat of a stroller. The stowable covering 100 is made of a flexible fabric that conforms to the shape of the stroller seat. The stroller includes a frame 200 and a seat 202 coupled to the frame. The frame 200 includes a plurality of legs 206 that each include one or more wheels 204 upon which the stroller 200 rolls. Although FIGS. 1 and 2 depict the stroller 200 including four legs that each include two wheels, the stroller may include less wheels and/or legs (e.g., three wheeled jogging strollers and the like). The seat 202 includes a bottom portion 208 upon which the child sits and a back support 216 that supports the child's back. The frame 200 includes a support structure 214 (e.g., horizontally extending tubes) that is attached to and supports the bottom portion 208 of seat 202.

The frame 200 or seat 202 may also include a shade covering (not shown) positioned above the child's head that folds open to partially cover and shade the child or that folds up in an accordion like manner and is positioned adjacent the back support 216 when not being used. The frame 200 may also include a handle or pair of handles 210 that a user may grasp to push the stroller. The handles 210 may be attached to the frame 200 via extension tubes 212. In one embodiment, the frame 200 is made of metal or plastic tubing. The frame 200 and/or seat 202 may be foldable to facilitate storage and/or transportation of the stroller.

The stowable covering 100 is fitted about the seat 202 of the stroller. Because the covering 100 is made of a flexible fabric, the shape of the stowable covering 100 corresponds to the shape of the seat 202 and/or frame 200. For example, the shade covering (not shown) may be extended so that a top portion of the stowable covering 100 rests on or is supported by the shade covering. A front portion of the stowable covering including a window 111 may hang roughly vertically from the shade covering. The front most portion of the stowable covering 100 may be secured to a tray (not shown) of the stroller adjacent the child's legs or feet. The tray (not shown) may be a tray that supports the child's food and/or toys. When fitted about the stroller seat 202, the shape of the stowable covering 100 may be roughly domed with the child seated inside. In other embodiments, the stowable covering 100 may include ribs (not shown) or other supports that help define the shape of the covering.

The stowable covering 100 includes a top surface 102 that faces the exterior or environment surrounding the stroller, and includes a bottom surface (not shown) that faces the child seated in seat 202. The covering 100 also includes an outer periphery or edge 104 that extends around the covering. The periphery or edge 104 defines an opening (see 140 of FIG. 3)

through which the seat 202 of the stroller is positioned. In other words, the bottom portion of the covering 100 is open so that the covering may be placed about the stroller seat 202 and secured thereto. A coupling mechanism is attached to the covering 100 at the periphery or edge 104. The coupling mechanism may include an elastic band stitched or otherwise coupled to the periphery or edge 104. Other coupling mechanisms include an elastic band, drawstrings threaded through a casing or holes of the periphery or edge 104, clips and the like. The drawstrings operate with a cord lock to draw the opening closed or allow the opening to be expanded. Similarly, the elastic band (or sections of elastic band) is expandable so that the outer periphery or edge 104 may expand and constrict.

The coupling mechanism allows the covering 100 to be secured about the seat 202 of the stroller. For example, the opening of covering 100 may be expanded by expanding the elastic band or loosening the cord lock and sliding the drawstrings within the casing. The expanded opening allows the bottom portion of the covering 100 to be placed about the seat 202 of the stroller. The elastic band may then constrict about the seat or the drawstrings may be pulled to draw the periphery or edge 104 into contact with the seat 202 and thereby secure the covering 100 about the seat.

The top surface 102 may include a front section 102, middle section 120, and rear section 122 that may be made of the same or different fabrics and/or include different designs, patterns, or colors. The top surface 102 also includes a window 111, front flap 110, and tie 109. The window 111 typically allows a child to view external objects through the window and/or allows parents or guardians to view the child through the window. The window 111 may be constructed of a fabric mesh material or may be a clear plastic sheet. Front flap 109 is foldable or rollable over window 111 to cover the window 111 as shown in FIG. 1 or to uncover the window as shown in FIG. 2. The tie 109 secures the front flap 110 in the folded position as shown in FIG. 2 so that the front flap 111 does not cover the window 111. The tie 109 may include a fastener(s) to secure the window, such as hook and loop fasteners, buttons, clips, snaps, magnets, an the like.

The top surface 102 also includes one or more side windows 114 that allow air to flow into and out of the covering 100. Although not shown, the side windows 114 may include flaps that cover the side windows. The top surface 102 additionally includes a top flap 118 that covers an access opening (150 of FIG. 4) and/or pocket (130 of FIGS. 3 and 4). The top flap 118 attaches to the pocket when the covering 100 is disposed within the pocket to secure the covering in a stowed state as described herein. The pocket includes compartments that provide storage space for various items, such as food and/or drink, toys, car keys, mobile phone, and the like.

An attachment mechanism 112 may be coupled with the top surface 102 near the pocket. The attachment mechanism may be a decorative flexible member (e.g., may include leaves, flower, baseball bat, and the like) that attaches to an object such as a stroller or infant carrier to facilitate storage and/or transportation of the covering 100. For example, the attachment mechanism 112 may be threaded through an aperture of the stroller. Examples of such attachment mechanisms are described in copending U.S. patent application Ser. Nos. 12/827,870, filed Jun. 30, 2010 and 12/619,481, filed Nov. 16, 2009, the complete disclosure of which is herein incorporated by reference. Enlarged or elongated portions of the attachment mechanism 112 (e.g., the elongated leaves, baseball bat, and the like) prevent the attachment mechanism 112 from withdrawing through the aperture on its own. To detach the covering 100 from the stroller, infant carrier, or other object, a user may pull on the covering, which forces the flexible attachment mechanism through the aperture of the stroller or infant carrier.

A skirt 106 is attached to the stowable covering 100 adjacent the front most edge of the top surface 102. The skirt 106 is stowable within a pouch 108 of the covering. One advantage of the stowable skirt 106 is that it renders covering 100 adjustable between child seats (e.g., between a stroller and infant carrier). For example, the skirt 106 may be stowed within pouch 108 when the covering 100 is fitted about an infant carrier to remove excess material, and may be deployed from pouch 108 when the covering 100 is fitted about a stroller to cover a child's lower limbs.

Pouch 108 includes a closing mechanism 105, such as a zipper extending along the front most edge of the top surface 102. In other embodiments, other means of closing the pouch 108 may be employed, including buttons, clips, snaps, magnets, and the like. The closing mechanism 105 is generally positioned above the coupling mechanism. In some embodiments, the pouch is formed at the front most edge of the top surface 102 by stitching a second sheet (not shown) directly under the front most edge of the top surface 102. The top surface 102 and second sheet provide an opening or chamber within which the skirt 106 may be folded and secured. In other embodiments, the flexible sheet of the stowable covering 100 includes two or more separate sheets and the separate sheets are used to form pouch 108 at the foremost edge of top surface 102. The skirt 106 is deployable from the pouch 108 to provide an additional covering. For example, as shown in FIG. 1, the skirt 106 may be deployed to cover the lower limbs and/or legs of the child seated in seat 202 or the skirt 106 may be stowed in the pouch 108 so that the lower limbs and legs are not covered as shown in FIG. 2.

A child, such as an infant or newborn, may be placed in seat 202 and the covering 100 may be placed about the seat 202 so that the child is fully or partially enclosed therein. The stroller may be pushed around with the covering 100 attached thereto. The windows 111 and/or 114 may be covered if the child is sleeping or restful or may be opened to allow the child to see external objects around the stroller. The covering 100 may provide a wind break and/or rain break for the child to help prevent the child from getting cold and/or sick. In addition, the covering 100 may protect the child from insects and bugs.

Figure 3:
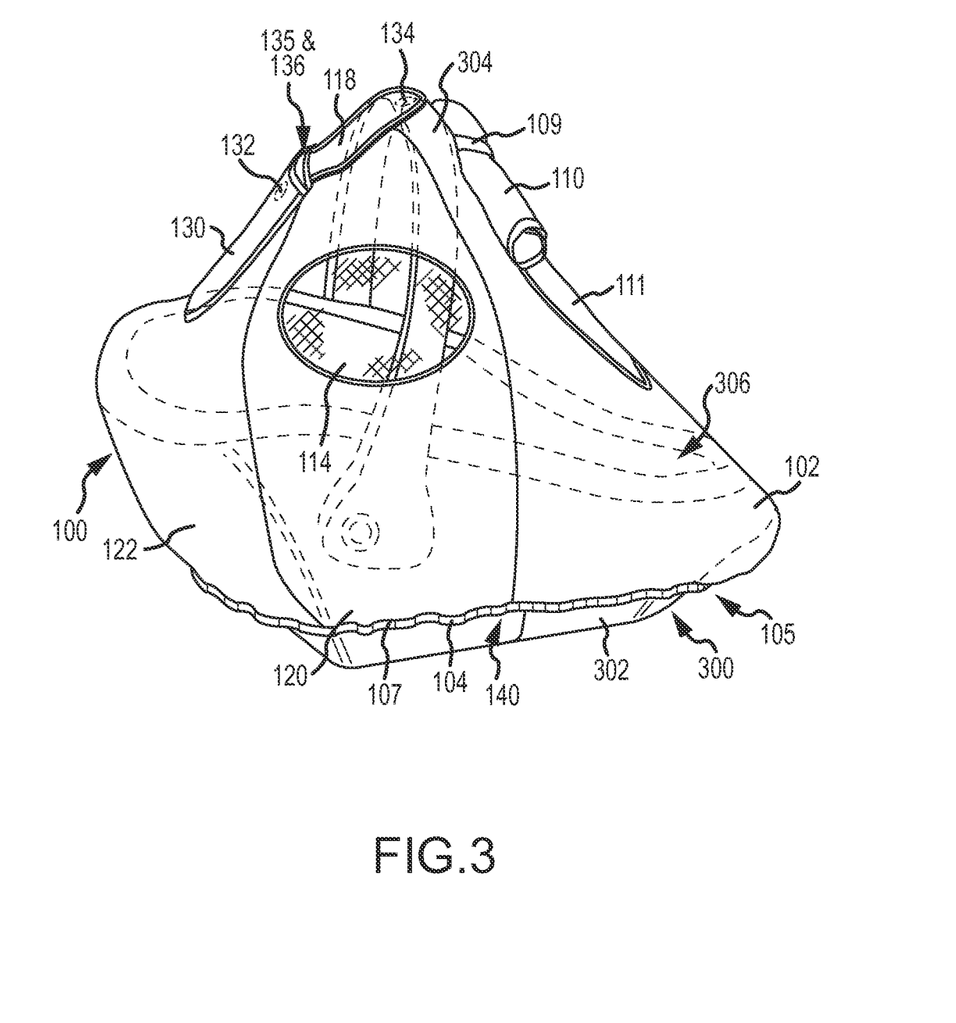
FIGS. 3 and 4 illustrate various features of a stowable covering fitted about an infant carrier according to an embodiment of the present invention.
Figure 4:
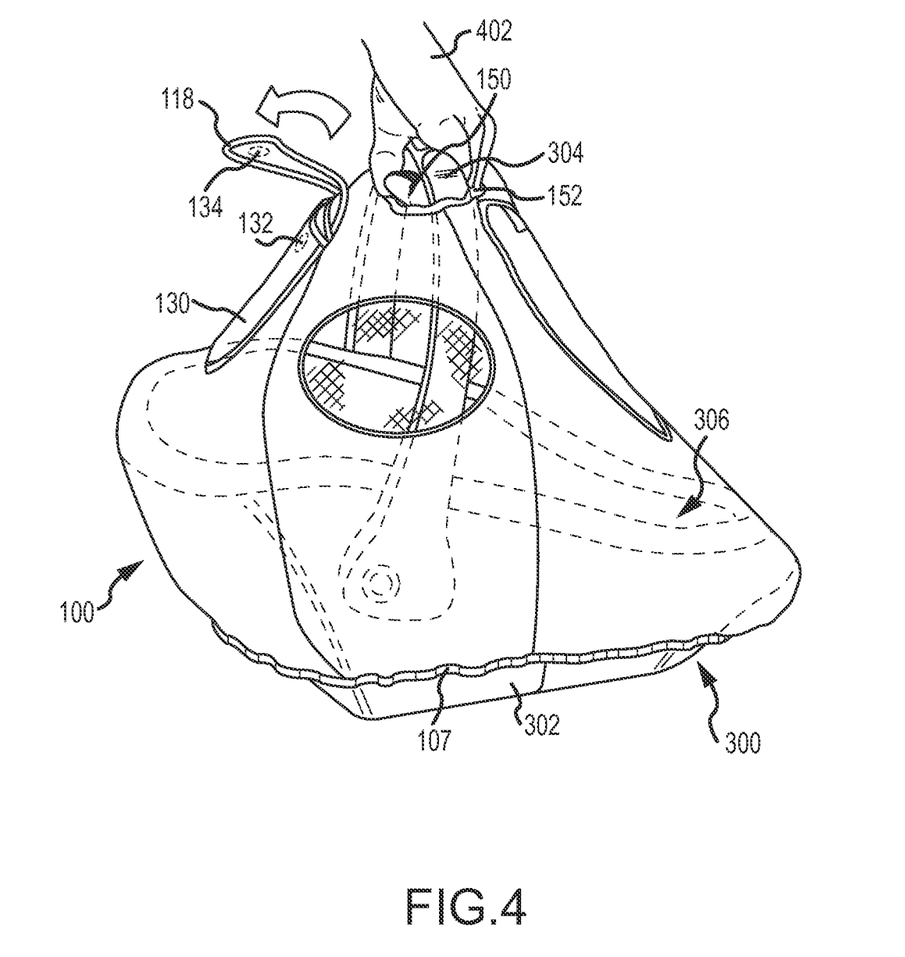

Referring now to FIGS. 3 and 4, depicted is the stowable covering 100 fitted about an infant carrier 300. As in FIGS. 1 and 2, the shape of the stowable covering 100 generally corresponds to the shape of the infant carrier 300 although the covering may include supporting structures that define the covering's shape. For example, as shown in FIGS. 3 and 4, the handle 304 of the infant carrier 300 supports the top surface 102 so that the covering does not rest on the child seated within the infant carrier.

The infant carrier 300 includes a base portion 302 and a handle 304 attached to the base portion. The handle 304 is grasped by a user so that the infant carrier 300 may be transported. The infant carrier 300 also includes a seat portion 306 within which the child is placed. The seat portion 306 is typically lined with a fabric and includes padding that cushions the child. Fitted about the infant carrier 300 is the stowable covering 100. The covering 100 includes the features described herein, such as a top surface 102, a bottom surface that faces the child, a window 111, a front flap 110, a tie 109, one or more side windows 114, a middle portion 120, a rear portion 122, an outer periphery or edge 104, a coupling mechanism 107, a pouch 105, a skirt (not shown), a closing mechanism (not shown), a pocket 130, a top flap 118, one or more fasteners (132 and 134), and the like.

FIGS. 3 and 4 depict the coupling mechanism 107 constricting a bottom portion of the stowable covering 100 about the tapered base 302 of infant carrier 300 to secure the covering to the infant carrier. As described herein, the coupling mechanism 107 may include an elastic band that automatically draws the edge 104 inward and/or may include drawstrings disposed within a casing that are manually operated and secured with a cord lock. Also as described herein, the expansion and constriction of the bottom portion of covering 100 expands and contracts the opening 140 of the covering 100 to allow the covering to be placed over the infant carrier 300 and secured thereto. The constriction of the bottom portion of covering 100 about the tapered base 302 also prevents or hinders the automatic or accidental removal of the covering from the infant carrier.

As when the covering 100 is fitted about the stroller, the window 111 is positioned in front of a child seated and/or secured within the infant carrier. Likewise, the side windows 114 are on either or both sides of the child. Window 111 and/or side window(s) 114 allow the child to view external objects and allow a parent or guardian to view the child seated in the infant carrier 300. The front flap 110 may be folded and secured with tie 109 as depicted in FIG. 3 so that the windows 111 is uncovered or may be unfolded as depicted in FIG. 4 so that the front flap substantially covers the window 111. In FIG. 3, the top flap 118 is folded over the handle 304 of the infant carrier 300 and secured to the upper most surface of top surface 102 via fastener 134, which may include a hook and loop fastener, clips, magnets, snaps, buttons, and the like. With the top flap 118 secured over the handle 304, the opening to the pocket 130 is exposed. The pocket 130 may include two compartments 135 and 136 (see also FIG. 5A) that provide storage space for various items (e.g., food, drinks, toys, mobile phone, car keys, and the like) when the covering 100 is secured about the infant carrier 300. Likewise, as described herein, the covering 100 may be positioned and stowed within compartment 135. Pocket 130 also includes a fastener 132 that couples with top flap 118 when top flap 118 is placed over and covers pocket 130.

FIG. 4 depicts the top flap 118 being positioned over the pocket 130 to expose an access opening 150. The access opening 150 is a roughly circular opening positioned near the top most surface of the covering 100. The access opening 150 includes an edge 152 that may or may not include an elastic band to draw the edge against the handle 304. The access opening 150 provides access to the handle 304 of infant carrier 300 so that a user 402 may grasp handle 304 and transport infant carrier 300 without removing the covering 100. The top flap 118 is securable to the pocket 130 to secure and protect items placed in the pocket's compartments 135 and 136. When the infant carrier 300 is not being transported, the top flap 118 may cover the access opening 150 to fully enclose a child within the covering 100.

A child, such as an infant or newborn, may be placed in infant carrier 300 and the covering 100 may be placed about the infant carrier 300 so that the child is fully or partially enclosed therein. A parent or guardian may then place top flap 118 over pocket 130 to access handle 304 through access opening 150. The parent or guardian may grasp handle 304 through access opening 150 and transport the child and infant carrier 300 while covering 100 is secured to the infant carrier 300 and covers the infant carrier and child. The windows 111 and/or 114 may be covered if the child is sleeping or restful or may be opened to allow the child to see external objects around the infant carrier 300. The covering 100 may provide a wind break and/or rain break to help prevent the child from getting cold and/or sick. In addition, the covering 100 may protect the child from insects and bugs.

Figure 5A:
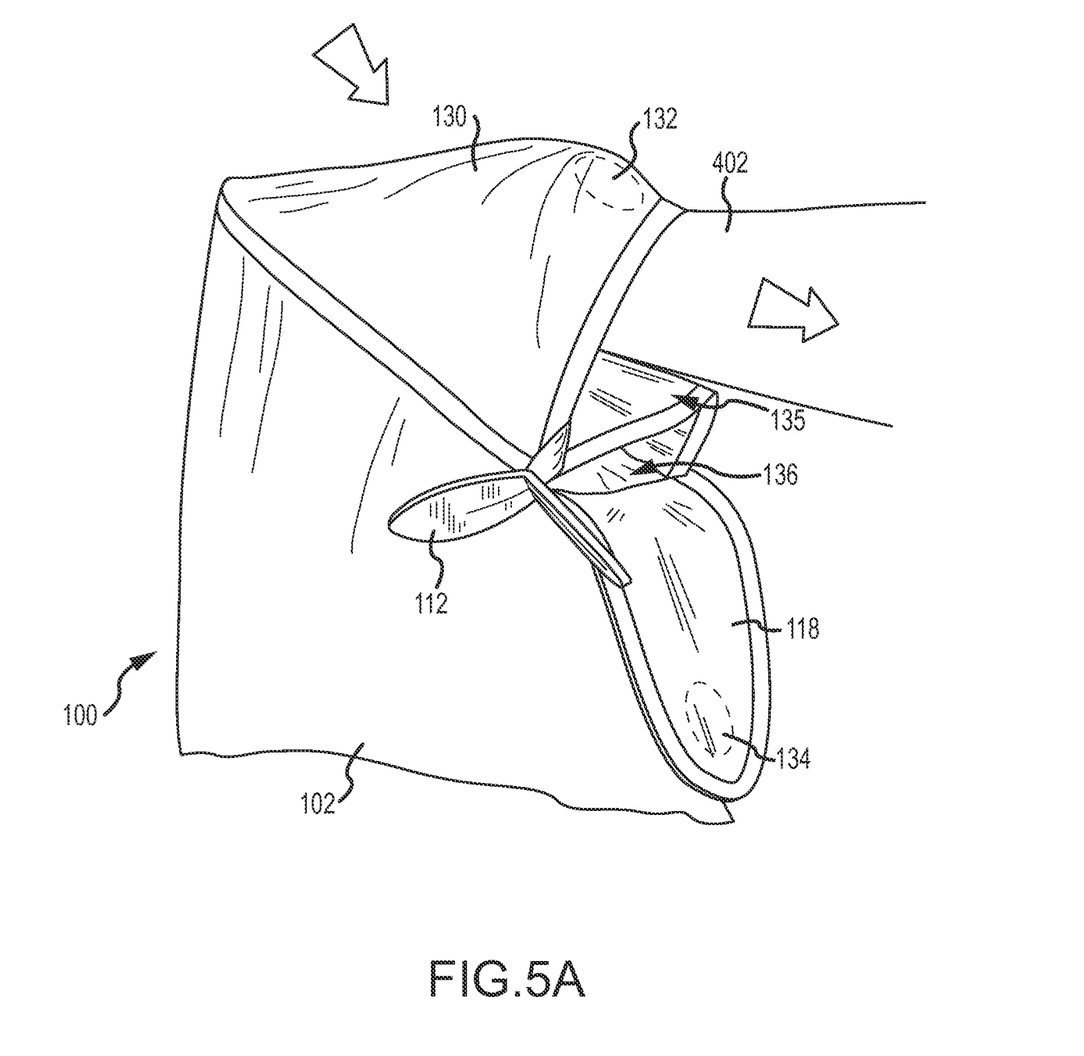
FIGS. 5A-5C illustrate a process of stowing the stowable covering within a pocket according to an embodiment of the present invention.
Figure 5B:
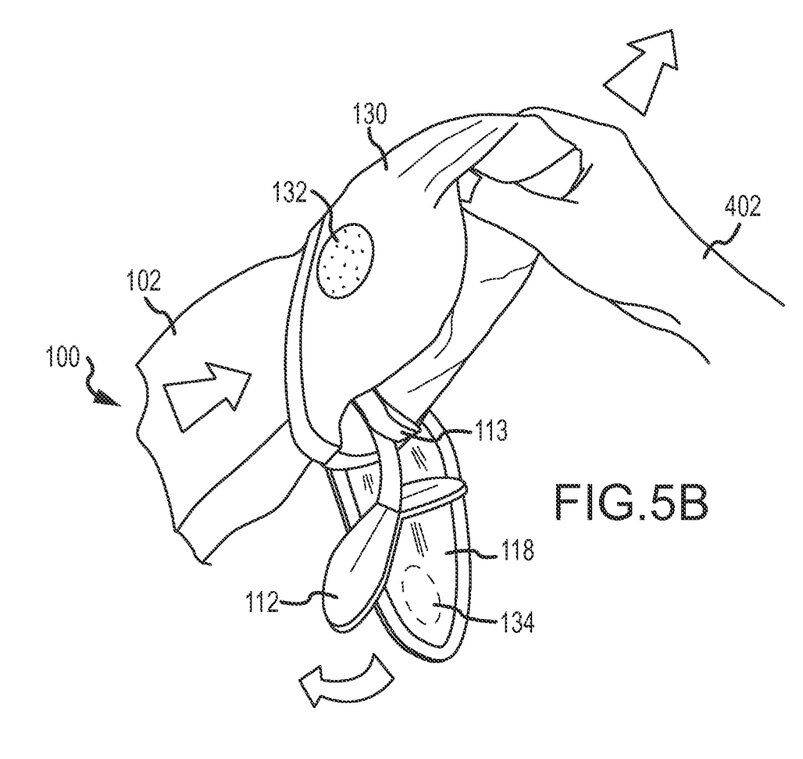
Figure 5C:
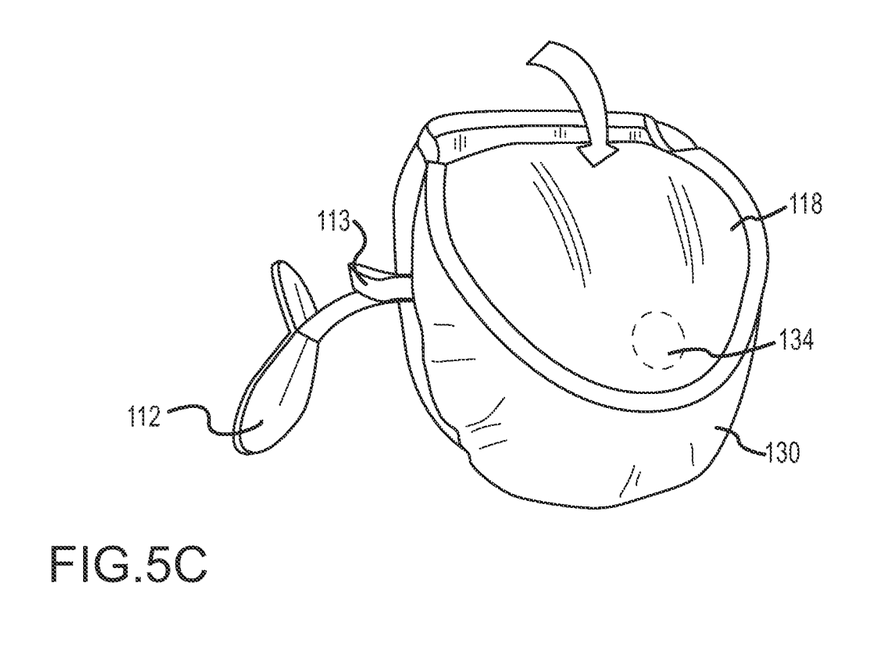

FIGS. 5A-5C illustrate a process for stowing the covering 100 within the pocket 130. In FIG. 5A, a user 402 places his or her hand within compartment 135 of pocket 130. The user 402 grabs ahold of the sheet of top surface 102 with his or her hand. With the top surface 102 secured in the user's hand, the user 402 then withdraws his or her hand as shown by the arrow. The inside of the pocket is pulled through the opening of compartment 135 causing compartment 135 and pocket 130 to evert as shown by the arrows and depicted in FIG. 5B. The portion of the covering 100 attached to pocket 130 is disposed within the pocket 130 as the pocket is everted. The remainder of the covering 100 may then be folded or stuffed into pocket 130 for stowage. Alternatively, the covering 100 may be initially folded or crumpled adjacent to or directly below pocket 130 prior to everting the pocket. The user 402 may then grasp the folded or crumpled covering 100 and withdraw his or her hand from the compartment 135 to evert the pocket. Since the covering 100 is pre-folded adjacent to the pocket 130, the entire covering may be disposed within the pocket when the pocket is everted. As pocket 130 everts, the interior surface of compartment 135 become the exterior surface of pocket 130.

Everting the pocket 130 reveals fastener 132, which was initially on the interior surface of compartment 135. Fastener 132 is used with fastener 134 of front flap 118 to secure the covering 100 within pocket 130. Fasteners 132 and 134 may be any type of fastener including hook and loop, buttons, snaps, ties, clips, magnets, and the like. Once the covering 100 is disposed within pocket 130, the front flap 118 is positioned over the pocket 130 and fastener 134 is secured to fastener 132 as depicted in FIG. 5C. Attachment mechanism 112 extends from a side or top of everted pocket 130 and is attachable to an external object such as a stroller, infant carrier, and the like. As described herein, the attachment mechanism 112 may be threaded through an aperture of an external object to releasably couple the stowable covering 100 to the external object (e.g., the individual leaves may be folded together, threaded through an aperture of a stroller, and release so that the leaves prevent the stowable covering from automatically detaching from or sliding through the aperture). Compartment 136 may be accessible to the user 402 so that one or more items (keys, toys, and the like) may be stored within compartment 136 when the pocket 130 is everted. The everted pocket 130 may also include a loop 113 that may be clipped to an external object for storage and/or transportation.

Figure 6:
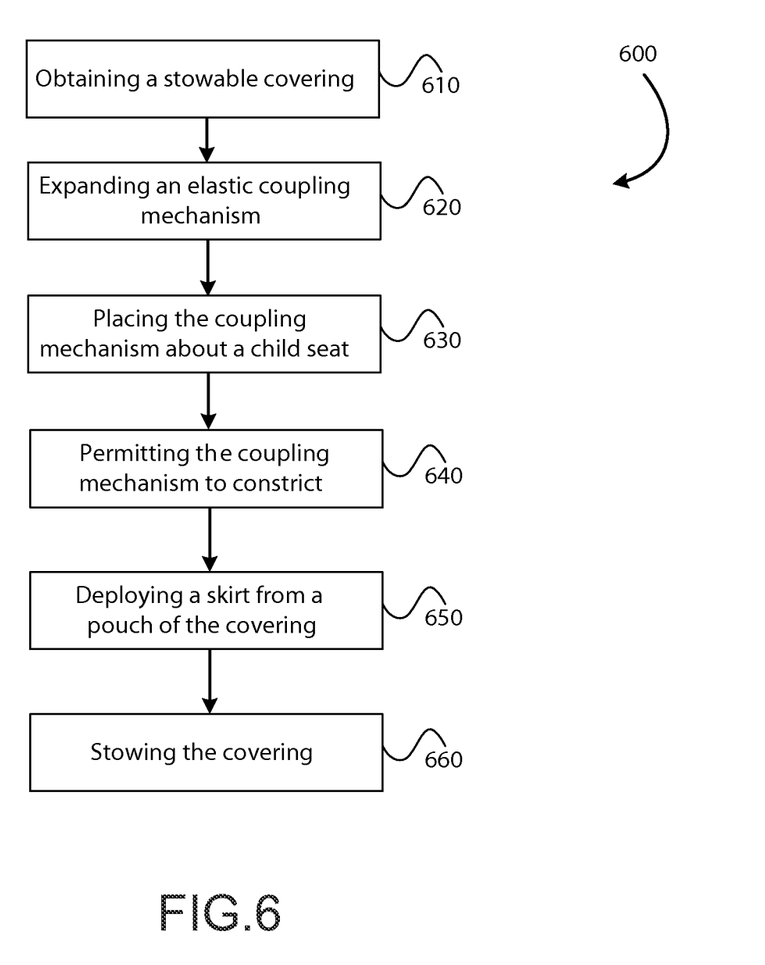
FIG. 6 illustrates a method of covering a child seat with a stowable covering according to an embodiment of the present invention.

FIG. 6 illustrates a method 600 for using a stowable covering to cover a child seat. At block 610, a stowable covering is obtained. The stowable covering may include a flexible fabric sheet having a top surface, a bottom surface, an outer periphery, an elastic coupling mechanism, and a pocket as described herein. At block 620, an elastic coupling mechanism is expanded to expand the opening of the stowable covering. At block 630, the coupling mechanism is placed about at least a portion of the child seat (e.g., infant carrier or stroller seat). Placing the coupling mechanism about the child seat includes positioning the child seat through the opening so that at least a portion of the child seat is within an interior space of the stowable covering. At block 640, the coupling mechanism is permitted to constrict about the child seat to secure the covering about the child seat. For example, the bottom portion of the stowable covering may be constricted about a tapered bottom portion of an infant carrier or may constrict around the seat of a stroller.

Optionally, at block 650 a skirt may be deployed from a pouch of the stowable covering to provide an additional covering, such as to cover the lower limbs or legs of a child seated in the stroller. Optionally, at block 660, the stowable covering may be stowed within a pouch attached to the sheet of the stowable covering (e.g., attached to the top or bottom surface). Stowing the stowable covering may include everting the pocket so that the sheet is disposed within the pocket. The covering may then be folded or stuffed into the everted pocket. Alternatively or additionally, the stowable covering may be folded near the pocket prior to everting the pocket so that upon everting the pocket, the stowable covering is disposed within the pocket. Stowing the stowable covering may also include securing a flap to the pocket to secure the sheet within the pocket.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A stowable covering configured to be separately fitted about both a child carrier and a stroller, wherein the child carrier comprises a base portion defining a seat and a handle that is positionable above the seat to permit a child lying in the seat to be carried using the handle, wherein the base portion further comprises an outer edge about the entire base, wherein the seat has a head portion for receiving a child's head and a foot portion for receiving a child's feet, and wherein the stroller comprises a frame with wheels, a seat vertically disposed above the wheels and at least one handle disposed above the seat, wherein the seat has a back for supporting a child's head and a torso, and a base for supporting the child's bottom and upper legs, with the child's lower legs hanging over the base, the stowable covering comprising:

a sheet of flexible fabric having an expanded shape defined by the child carrier or stroller when fitted thereto, the sheet comprising:
   a top surface,
   a bottom surface,
   an outer periphery defining an opening through which a portion of the child carrier and stroller may be received;
   a coupling mechanism at the outer periphery that is configured to secure the sheet about the child carrier and stroller by constricting about a portion of the child carrier and stroller when the stowable covering is fitted thereto, wherein the outer periphery is sized and shaped so that when the stowable covering is placed about the child carrier, the outer periphery extends over and around the outer edge of the entire base such that the sheet entirely covers and extends below the outer edge while also covering the handle to fully enclose a child when lying in the child carrier, and wherein when the stowable covering is placed about the stroller, the outer periphery extends over a top end of the seat and terminates vertically above a bottom end of the seat such that a child's lower extremities remain accessible when sitting in the seat of the stroller;
   a skirt stowable within a pouch positioned at a front end of the stowable covering, the skirt being deployable from the pouch to extend completely over and hang down below the bottom end of the seat of the stroller; and
   wherein the pouch when containing the skirt is configured to be placed over the outer edge of the carrier and be located at the foot portion and vertically beneath the outer edge when the sheet is coupled to the carrier, and wherein when the sheet is coupled to the stroller, the pouch hangs vertically above the base of the stroller seat, with the skirt hanging below the base of the seat when the skirt is deployed;
   a pocket coupled to the sheet to permit the sheet to be folded and stowed within the pocket.

2. The stowable covering of claim 1, wherein the sheet is folded and stowed within the pocket by everting the pocket.

3. The stowable covering of claim 1, wherein the sheet further comprises an access opening opposite the opening defined by the outer periphery, the access opening providing access to a handle of an infant carrier when the stowable covering is fitted thereto.

4. The stowable covering of claim 3, wherein the sheet further comprises a flap that is positionable over the access opening when the stowable covering is fitted about the infant carrier and that is positionable to completely cover the opening of the pocket when the sheet material is folded and stowed therein.

5. The stowable covering of claim 1, wherein the pouch comprises a fastener to secure the skirt within the pouch.

6. The stowable covering of claim 1, wherein the sheet further comprises an attachment mechanism attachable to an external object for transportation when the stowable covering is stowed within the pocket.

7. The stowable covering of claim 1, wherein the sheet further comprises a window, a front flap, and a tie, the front flap having an unfolded position that covers a majority of the window and a folded position in which a majority of the window is uncovered, the tie being configured to secure the flap in the folded position.

8. The stowable covering of claim 1, wherein the coupling mechanism comprises one or more elastic bands that allow the opening to expand to be fitted over the child carrier and that allow the opening to contract around the child carrier to secure the stowable covering to the child carrier.

9. The stowable covering of claim 1, wherein the coupling mechanism comprises a drawstring and cord lock slidably coupled with the drawstring, the drawstring and cord lock allowing the opening to expand to be fitted over the child carrier and to contract around the child carrier to secure the stowable covering to the child carrier.

10. A method for separately covering both a child carrier and a stroller, wherein the child carrier comprises a base portion defining a seat and a handle that is positionable above the seat to permit a child lying in the seat to be carried using the handle, wherein the base portion further comprises an outer edge about the entire base, wherein the seat has a head portion for receiving a child's head and a foot portion for receiving a child's feet, and wherein the stroller comprises a frame with wheels, a seat vertically disposed above the wheels and at least one handle disposed above the seat, wherein the seat has a back for supporting a child's head and torso, and a base for supporting the child's bottom and upper legs, with the child's lower legs hanging over the base, the method comprising:

obtaining a stowable covering comprising:

a sheet of flexible fabric comprising:

a top surface;

a bottom surface;

an outer periphery;

an elastic coupling mechanism at the outer periphery; and             a pocket coupled to the top surface or the bottom surface of the sheet;

a pouch containing a deployable skirt;

expanding the elastic coupling mechanism;

placing the coupling mechanism about the child carrier such that the outer periphery of the covering extends over and around the outer edge of the entire base such that the sheet entirely covers and extends below the outer edge while also covering the handle to fully enclose a child when lying in the child carrier, with the pouch extending below the outer edge at the foot portion; and     permitting the elastic coupling mechanism to constrict about the base below the outer edge to secure the stowable covering to the child carrier;

removing the cover from the child carrier and placing the cover about the stroller such that the outer periphery extends over a top end of the back of the seat and terminates vertically above the base of the seat such that the pouch hangs vertically above the base of the seat and child's lower extremities remain accessible when sitting in the seat of the stroller; and     deploying the skirt from the pouch to cover the legs and feet of the child when seated in the stroller seat.

11. The method of claim 10, further comprising stowing the stowable covering, wherein stowing comprises:

folding the sheet together near the pocket; and everting the pocket so that the sheet is disposed within the pocket.

12. The method of claim 11, further comprising securing a flap to the pocket to secure the sheet within the pocket.

13. The method of claim 10, wherein the stowable covering comprises a window positioned in front of an infant or child seated in the child carrier when the stowable covering is fitted about the child carrier; and wherein the method further comprises:

unfolding a flap coupled with the sheet so that the window is substantially covered by the flap; or     folding the flap so that the window is substantially uncovered by the flap and securing the flap with a tie to prevent the flap from unfolding.

14. A stowable covering configured to be separately fitted about both a stroller seat and infant carrier to cover at least a portion of the stroller or infant carrier, wherein the child carrier comprises a base portion defining a seat and a handle that is positionable above the seat to permit a child lying in the seat to be carried using the handle, wherein the base portion further comprises an outer edge about the entire base wherein the seat has a head portion for receiving a child's head and a foot portion for receiving a child's feet, and wherein the stroller comprises a frame with wheels, a seat vertically disposed above the wheels and at least one handle disposed above the seat, wherein the seat has a back for supporting a child's head and torso, and a base for supporting the child's bottom and upper legs, with the child's lower legs hanging over the base, the stowable covering comprising:

a sheet of flexible fabric comprising:

a top surface, a bottom surface, an outer periphery defining an opening through which a portion of the stroller seat or infant carrier may be received;

a window capable of being positioned in front of an infant or child seated in the stroller seat or infant carrier when the stowable covering is fitted thereto;

an elastic coupling mechanism at the outer periphery that is configured to secure the sheet about the stroller seat or infant carrier by constricting about a portion of the stroller seat or infant carrier when the stowable covering is fitted thereto, wherein the outer periphery is sized and shaped so that when the stowable covering is placed about the child carrier, the outer periphery extends over and around the outer edge of the entire base such that the sheet entirely covers and extends below the outer edge while also covering the handle and is capable of fully enclosing a child when lying in the child carrier, and wherein when the stowable covering is placed about the stroller, the outer periphery extends over a top end of the seat and terminates vertically above a bottom end of the seat such that a child's lower extremities remain accessible when sitting in the seat of the stroller;

a skirt stowable within a pouch positioned at a front end of the stowable covering, the skirt being deployable from the pouch to extend completely over and hang down below the bottom end of the seat of the stroller; and     wherein the pouch when containing the skirt is configured to be placed over the outer edge of the carrier and be located at the foot portion and vertically beneath the outer edge when the sheet is coupled to the carrier, and wherein when the sheet is coupled to the stroller, the pouch hangs vertically above the base of the stroller seat, with the skirt hanging below the base of the seat when the skirt is deployed;

a pocket coupled to the top surface of the sheet to permit the sheet to be folded and stowed within the pocket.

15. The stowable covering of claim 14, wherein the sheet further comprises a pair of side windows capable of being positioned on opposite sides of an infant or child seated in the stroller seat or infant carrier when the stowable covering is fitted thereto.

\* \* \* \* \*